United States Patent [19]

Inoue et al.

[11] 4,407,914
[45] Oct. 4, 1983

[54] ALKALINE GALVANIC CELL

[75] Inventors: Takao Inoue, Hirakata; Tamotsu Wakahata, Katano; Keigo Momose; Yukio Maeda, both of Hirakata, all of Japan

[73] Assignee: Matsushita Electric Industrial Co., Ltd., Japan

[21] Appl. No.: 333,190

[22] Filed: Dec. 21, 1981

[51] Int. Cl.³ .............................................. H01M 2/08
[52] U.S. Cl. .................................... 429/174; 429/185
[58] Field of Search ............... 429/174, 171, 172, 173, 429/185

[56] References Cited

U.S. PATENT DOCUMENTS 3,713,896  1/1973  Feldhake .............................. 429/174
3,922,178  8/1973  Winger .
3,990,918  11/1976  Bro et al. ........................ 429/174 X
4,238,555  12/1980  Metani et al. .................... 429/174 X
4,263,380  4/1981  Riedl ................................ 429/174 X Primary Examiner—Charles F. LeFevour
Attorney, Agent, or Firm—Wenderoth, Lind & Ponack

[57] ABSTRACT

An alkaline galvanic cell including a container serving for a cathode terminal, a sealing plate in the form of a layered clad plate serving for an anode terminal to be fitted into the container, and an insulating packing provided between the sealing plate and container for sealing the cell upon assembly. The cell is provided with a layer of epoxy adduct polyamide amine having amine valence in the range of 50 to 400 and disposed between the innermost copper layer of the sealing plate arranged to be readily amalgamated and the insulating packing so as to serve as a sealing agent or liquid leakage suppression agent.

7 Claims, 2 Drawing Figures

ALKALINE GALVANIC CELL

BACKGROUND OF THE INVENTION

The present invention generally relates to a primary cell and more particularly, to a sealing construction of an alkaline galvanic cell such as a silver oxide cell, mercury cell, alkaline manganese cell, nickel-zinc cell or the like.

Generally, as shown in FIG. 1, an alkaline galvanic cell particularly, of a flat type includes a metallic container M serving as a cathode terminal member (referred to a cathode container hereinbelow) in which a cathode active substance A mainly composed of silver oxide or manganese dioxide, a separator S and an electrolyte impregnated material E are successively accommodated, and a sealing plate or sealing container P serving as an anode terminal member (referred to as an anode sealing plate hereinbelow) in which an anode active substance C composed of a mixture of amalgamated zinc powder and alkaline electrolyte subjected to gelation is housed. The anode sealing plate P is fitted into the cathode container M, through an electrically insulating packing I made of synthetic resin such as polyamide resin, polyolefin resin or the like and closely fitted around the peripheral edge of said sealing plate P, with the upper peripheral edge of said cathode container M being crimped inwardly for hermetically sealing the cell.

For the insulating packing I referred to above, there have conventionally been employed nylon, polypropylene, ethylene tetrafluoroethylene copolymer resin, high density polyethylene, etc. However, since a sufficient sealing property can not be obtained by the known insulating packings as described above, various other methods have also been proposed, for example, a method disclosed in U.S. Pat. No. 3,922,178 employing a fatty polyamide amine as a sealing agent, or another method disclosed in U.S. Pat. No. 3,713,896 using a product of the curing reaction between amine and epoxy as a sealing agent, for example, as shown at L in FIG. 1.

As a result of careful investigations carried out by the present inventors into the prior art as described above, however, it has been found that, although useful for improving the sealing effect, fatty polyamide amine is not fully satisfactory from the viewpoint of a leakage prevention or leakage resistance. On the other hand, in the case where the sealing is effected by applying a mixture of epoxy and polyamide onto the sealing plate P for subsequent hardening, there have been inconveniences such that the amount of application is undesirably altered due to the gradual progress of reaction between the epoxy and polyamide before the actual application of the sealing agent onto the sealing plate P, with a favorable leakage prevention property not being available due to deterioration in the close adhesion with respect to the sealing plate P.

Upon further study into the influence of amine valence in fatty polyamide over the leakage prevention property, the present inventors have discovered the fact that the larger the amine valence is, the less is the copper surface contacting the sealing agent, subjected to amalgamation. More specifically, fatty polyamide amine having amine valence (ASTM D2074-62T) in the range larger than 80 to less than 400 is basic, with a large amount of active hydrogen, and if applied to a cell, closely adheres onto the surface of a copper layer located at the innermost portion of the anode sealing plate P which is of a layered clad plate to retard excessive progress of amalgamation for preventing creeping of the alkaline electrolyte.

SUMMARY OF THE INVENTION

Accordingly, an essential object of the present invention is to provide an alkaline galvanic cell of a flat type which has an improved sealing construction and is superior in leakage prevention property.

Another important object of the present invention is to provide an alkaline galvanic cell of the above described type which is simple in construction and stable in functioning at high reliability, and can be readily manufactured on a large scale at low cost.

In accomplishing these and other objects, according to one preferred embodiment of the present invention, there is provided an improved alkaline galvanic cell of a flat type which includes a cathode container, and an anode sealing plate which is fitted into the cathode container through an insulating packing. The anode sealing plate made, for example, of a three layered clad material of a copper layer, a stainless steel layer and a nickel layer extending from an innermost portion to the outermost portion of said anode sealing plate, is provided with an epoxy adduct polyamide amine layer serving as a sealing agent or leakage suppression agent of the electrolyte and disposed between the anode sealing plate and the insulating packing for preventing corrosion of the copper layer of leakage of alkaline electrolyte due to excessive amalgamation, with consequent improvement of preserving performance of the cell.

By the arrangement according to the present invention as described above, an improved alkaline galvanic cell has been advantageously presented, with substantial elimination of disadvantages inherent in the conventional alkaline galvanic cells of this kind.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
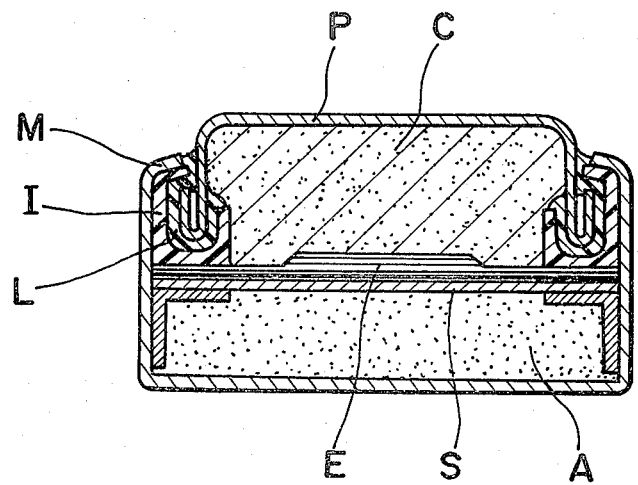
FIG. 1 is a longitudinal sectional view of a conventional alkaline galvanic cell (already referred to)
Figure 2:
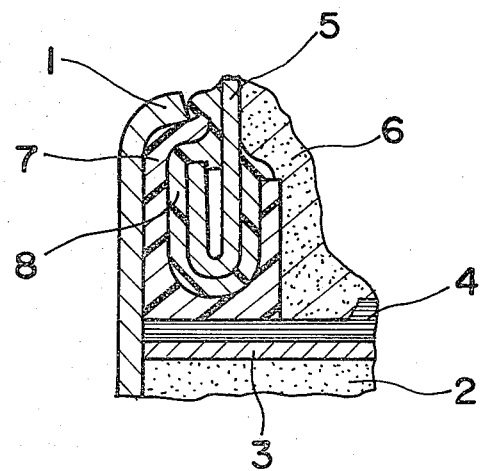
FIG. 2 is a fragmentary longitudinal sectional view showing, on an enlarged scale, the construction of an improved alkaline galvanic cell according to one preferred embodiment of the present invention.

Referring now to the drawing, there is shown in FIG. 2 an improved alkaline galvanic cell of a flat type according to one preferred embodiment of the present invention. The alkaline galvanic cell of FIG. 2 includes, generally in the similar manner as in the conventional cell of FIG. 1, a cathode container 1, containing therein a cathode active substance 2 mainly composed of silver oxide or manganese dioxide, a separator 3 and an electrolyte impregnated material 4, and an anode sealing plate 5 accommodating therein an anode active substance 6 composed of a mixture of amalgamated zinc powder and alkaline electrolyte subjected to gelation and fitted into the cathode container 1 through an insulating packing 7 made of synthetic resin such as polyamide resin polyolefin resin or the like and closely fitted around the peripheral edge of the sealing plate 5, with the upper peripheral edge of the cathode container 1 crimped inwardly for the hermetic sealing of the cell. The anode sealing plate 5 made, for example, of a three layered clad material of a copper layer, a stainless steel layer and a nickel layer extending from an innermost portion to the outermost portion of said anode sealing plate is further provided with an epoxy adduct polyamide amine layer 8 serving as a sealing agent or leakage suppression agent of the electrolyte and disposed between the anode sealing plate 5 and the insulating packing 7 for preventing corrosion of the copper layer or leakage of alkaline electrolyte due to excessive amalgamation so as to consequently reduce deterioration of the cell.

It should be noted here that the present invention is particularly directed to the improvement of the sealing agent 8 for the alkaline galvanic cell of the flat type as described above and more specifically, to the sealing agent superior in high temperature leakage prevention property, with a small quality-wise deviation in the manufacturing process. According to the present invention, as the sealing agent 8 to be provided between the peripheral edge of the anode sealing plate 5 and the insulating packing 7 in FIG. 2, epoxy adduct polyamide amine having amine valence in the range of 50 to 400 is employed.

The epoxy adduct polyamide amine according to the present invention is prepared by slowly subjecting to reaction, (1) one or several kinds of amines selected from compounds having at least two epoxide groups in one molecule, and (2) one or several kinds of amines selected from compounds having at least two amino groups in one molecule, in a mixed solution of alcohol and aromatic hydrocarbon. The epoxy adduct polyamide amine of the present invention is required to be formed into a polymerization product having large amine valence in the range of 50 to 400 by subjecting the active hydrogen larger in amount than the epoxide group equivalent amount, to addition polymerization in the form of amine, and since a certain amount of amine remains in an independent form also, the molecular weight of diamine molecule should preferably be larger than 100. It is also to be noted that liquid leakage undesirably takes place at amine valence larger than 400, if an acceleration test is effected, while, at amine valence smaller than 50, liquid leakage also take place due to abnormal progress in the amalgamation of the copper layer of the anode sealing plate 5.

In connection with the above, it is essential that the addition polymerization as described above is effected under the state of excessive active hydrogen, and after completion of the reaction, viscosity variation should preferably be less than ±5% even after leaving at normal temperature for one month.

More specifically, in the use as the sealing agent 8, the epoxy adduct polyamide amine of the present invention is disposed between the innermost copper layer of the anode sealing plate 5 in the form of the three layered clad plate and the insulating packing 7, and for the actual application as the sealing agent, there may be employed a method in which, for example, the composition containing 20% by weight of the above reaction product is applied onto the anode sealing plate 5, and before complete drying thereof, the sealing plate 5 is fitted into the insulating packing 7, with a subsequent sufficient drying, so as to obtain a sealing structure having an extremely favorable thermo-plasticity and tack. In the above practice, the state of adhesion of the sealing agent 8 with respect to the copper layer can be appreciably improved. Meanwhile, the amine valence should properly be in the range of 50 to 400 and more preferably, in the range of 100 to 200. At the amine valence less than 50, wetting property of the sealing agent with respect to the copper surface becomes inferior, with rapid amalgamation of the copper layer, while on the contrary, if the amine valence exceeds 400, liquid leakage undesirably takes place even in the absence of amalgamation of the copper layer.

Subsequently, EXAMPLES are inserted for the purpose of illustrating the present invention, without any intention of limiting the scope thereof.

In Table given below, EXAMPLES 1, 2, 3, 4 and 5 represent results in which mixed compositions respectively prepared by subjecting to addition polymerization, bisphenol A epoxy resin having molecular weight in the range of 320 to 3800 (Epōn 812, tradename of and manufactured by Shell Chemicals Co., USA and fatty polyamide amine which is a reaction product of dibasic fatty acid and fatty acid diamine (Versamid 100, 115, 125 and 140, tradename of and manufactured by Henkel Japan Ltd.), in a mixed solvent of xylene/buthanol (weight ratio ½), are employed as the sealing agent 8 through application thereof to the sealing portion of the anode sealing plate 5, with subsequent assembly and drying. Meanwhile, EXAMPLE 6 shows results in which epoxy adduct polyamide amine, Tōhmide 213-A (name used in trade and manufactured by Fuji Kasei Kogyo Co., Ltd., Japan) is used as the sealing agent 8 through application thereof to the sealing portion of the anode sealing plate 5, with subsequent assembly and drying. EXAMPLE 7 denotes the results in which mixed composition prepared by subjecting to addition polymerization, Epōn 1007 and Versamid 140 mentioned earlier, is employed as the sealing agent through application thereof to the sealing portion of the anode sealing plate, with subsequent assembly and drying, and EXAMPLE 8 represents the results in which mixed compounds respectively prepared by subjecting to addition polymerization, Epōn 1009 and Versamid 100 earlier described, are employed as the sealing agent through application thereof onto the sealing portion of the anode sealing plate, with subsequent assembly and drying.

Meanwhile, Comparative data 1 represent the results as obtained when Versamid 100, referred to earlier, is employed as is for the sealing agent, and Comparative data 2 show results as obtained when known asphalt pitch is employed as the sealing agent. Comparative data 3 relate to the case where Epōn 1009 and Versamid 100, described earlier, is subjected to addition polymerization in a mixed solvent, are used as the sealing agent, while Comparative data 4 show the results obtained when Epon 1007 described earlier, and Genamid 2000 (tradename of and manufactured by Henkel Japan Ltd.) subjected to addition polymerization in a mixed solvent, are used as a sealing agent.

Additionally, for judging the effect of the sealing agents as described in the foregoing, 100 pieces of G-10 type cell were assembled with the use of such sealing agents under the same conditions, and the number of cells with leakage was counted after preservation for eight weeks under the conditions at temperature of 60° C. and relative humidity of 90%RH, while the state of amalgamation of the copper layer at the sealing portion of the anode sealing plate of each flat type alkaline galvanic cell after the preservation, was visually observed.

| No. | Amine valence (without solvent) | No. of cells with leakage (pieces) 40° C., 90% RH | No. of cells with leakage (pieces) 60° C., 90% RH | Results of observation of copper surface at sealing portion |
| --- | --- | --- | --- | --- |
| EXAMPLE 1 | 50 | 15 | 11 | Region more than half of the sealing portion amalgamated |
| EXAMPLE 2 | 100 | 2 | 1 | Slightly amalgamated |
| EXAMPLE 3 | 200 | 1 | 2 | Brightness of copper surface remains as it is |
| EXAMPLE 4 | 310 | 2 | 4 | Brightness of copper surface remains as it is |
| EXAMPLE 5 | 400 | 5 | 15 | Brightness of copper surface remains as it is |
| EXAMPLE 6 | 150 | 3 | 4 | Slightly amalgamated |
| EXAMPLE 7 | 105 | 2 | 2 | Slightly amalgamated |
| EXAMPLE 8 | 80 | 13 | 10 | Most of the sealing portion amalgamated |
| Comparative data 1 | 80 | 18 | 16 | Entire surface generally amalgamated |
| Comparative data 2 | — | 40 | 82 | Entire surface amalgamated |
| Comparative data 3 | 30 | 30 | 40 | Entire surface amalgamated |
| Comparative data 4 | 450 | 18 | 85 | Brightness of copper surface remains as it is |

As is clear from the foregoing description, by the employment of the epoxy adduct polyamide amine of the present invention as the sealing agent for the flat type alkaline galvanic cell, particular effects and advantages as follows can be achieved. (1) Alkaline galvanic cells superior in leakage prevention or leakage resistant properties may be provided at amine valence in the range of 50 to 400 and more preferably, of 100 to 200. (2) Since the sealing agent is already subjected to the addition polymerization, there is no further progress of reaction during the manufacturing process, thus presenting superior effects in the process for assembly of the cells. (3) The high amine valence effectively prevents excessive progress of amalgamation of the innermost copper layer of the anode sealing plate in the form of a three layered clad plate. (4) Owing to the addition of bisphenol group into the amine molecular chain, resistance against thermal deformation has also been improved.

Thus, the sealing agent directly related to the present invention is highly valuable for industrial application as a sealing agent capable of remarkably improving the leakage prevention property of the flat type alkaline galvanic cells.

It should be noted here that the layer of the sealing agent according to the present invention should preferably be as thin as practicable, and it is essential that the sealing agent of the present invention be in contact with the copper surface of the anode sealing plate. On the contrary, however, if only the above conditions are satisfied, polyamide or material treated by epoxy cured resin, etc. may be employed as the insulating packing.

It is also to be noted that although the foregoing embodiments have been mainly described with reference to the flat type alkaline galvanic cells, the present invention is not limited in its application to the flat type alkaline galvanic cells alone, but may readily be applicable, for example, to a cylindrical type alkaline cells or batteries with similar effects.

Although the present invention has been fully described by way of example with reference to the accompanying drawings, it is to be noted here that various changes and modifications will be apparent to those skilled in the art. Therefore, unless otherwise such changes amd modifications depart from the scope of the present invention, they should be construed as included therein.

What is claimed is:

1. An alkaline galvanic cell which comprises an anode sealing plate in the form of a layered clad plate having an innermost copper layer, in which an anode active substance is accommodated, a cathode container in which a cathode active substance is housed, an insulating packing provided around the peripheral edge of said anode sealing plate which is fitted into said cathode container for hermetically sealing said cell, a layer of epoxy adduct polyamide amine disposed at a sealing portion of said anode sealing plate between said innermost copper layer of said anode sealing plate and said insulating packing, said epoxy adduct polyamide amine being thermo-plastic, with a tack even after assembly of said cell and having amine valence in the range of 50 to 400.

2. The alkaline galvanic cell as claimed in claim 1, wherein said anode sealing plate is in the form of a three-layered plate having said innermost copper layer.

3. The alkaline galvanic cell as claimed in claim 1, wherein said epoxy adduct polyamide amine is prepared by subjecting to addition polymerization, epoxy resin and amine in amine excess composition in a mixed solvent of alcohol and at least one aromatic, hydrocarbon selected from the group consisting of benzene, toluene, and xylene, said epoxy adduct polyamide amine applied to said sealing portion having the tack even after drying of the solvent subsequent to assembly of said anode sealing plate and insulating packing.

4. The alkaline galvanic cell as claimed in claim 3, wherein said epoxy resin is of bisphenol A epoxy resin having molecular weight in the range of 320 to 3800.

5. The alkaline galvanic cell as claimed in claim 3, wherein said amine is of fatty polyamide amine which is a reaction product of dibasic fatty acid and fatty acid diamine.

6. The alkaline galvanic cell as claimed in claim 1 wherein said anode active substance comprises an alkaline electrolyte.

7. The alkaline galvanic cell as claimed in claim 6 wherein said alkaline electrolyte is admixed with zinc amalgam.

* * * * *